(12) United States Patent
Norieda et al.

(10) Patent No.: US 12,718,618 B2
(45) **Date of Patent: *Aug. 25, 2026**

(54) ANALYSIS APPARATUS, ANALYSIS SYSTEM, ANALYSIS METHOD, AND NON-TRANSITORY COMPUTER READABLE MEDIUM STORING PROGRAM

(71) Applicant: NEC Corporation, Tokyo (JP)

(72) Inventors: Shin Norieda, Tokyo (JP); Yoshiyuki Tanaka, Tokyo (JP); Shogo Akasaki, Tokyo (JP); Haruki Yokota, Tokyo (JP); Masami Sakaguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 462 days.

This patent is subject to a terminal disclaimer.

(21) Appl. No.: 18/030,146

(22) PCT Filed: Oct. 12, 2020

(86) PCT No.: PCT/JP2020/038528

§ 371 (c)(1),
(2) Date: Apr. 4, 2023

(87) PCT Pub. No.: WO2022/079774

PCT Pub. Date: Apr. 21, 2022

(65) Prior Publication Data

US 2023/0351806 A1 Nov. 2, 2023

(51) Int. Cl.
*G06V 40/16* (2022.01)
*G06V 20/50* (2022.01)

(52) U.S. Cl.
CPC ............ *G06V 40/174* (2022.01); *G06V 20/50* (2022.01)

(58) Field of Classification Search
CPC ............................ G06V 40/174; G06V 20/50
See application file for complete search history.

(56) References Cited

U.S. PATENT DOCUMENTS

| | | | | |
|---|---|---|---|---|
| 12,468,499 | B2 * | 11/2025 | Norieda | G06T 11/00 |
| 2015/0154960 | A1 * | 6/2015 | Ai | H04L 12/1827 704/246 |
| 2019/0228215 | A1 * | 7/2019 | Najafirad | G06N 3/044 |
| 2019/0303655 | A1 * | 10/2019 | Werner | G09B 5/00 |
| 2021/0176429 | A1 * | 6/2021 | Peters | G06V 20/41 |

FOREIGN PATENT DOCUMENTS

| | | | |
|---|---|---|---|
| JP | 2014-511620 | A | 5/2014 |
| JP | 2015-109526 | A | 6/2015 |
| JP | 2018-174425 | A | 11/2018 |
| JP | 2019-061594 | A | 4/2019 |
| JP | 2020-048149 | A | 3/2020 |

OTHER PUBLICATIONS

International Search Report for PCT Application No. PCT/JP2020/038528, mailed on Dec. 15, 2020.

* cited by examiner

*Primary Examiner* — Lixi C Simpson
(74) *Attorney, Agent, or Firm* — Sughrue Mion, PLLC

(57) ABSTRACT

An analysis apparatus sequentially acquires emotion data generated for each first period based on face image data of participants during an online meeting. The analysis apparatus generates analysis data indicating one analysis value regarding an evaluation for a second period in an ongoing online meeting based on emotion data including at least the latest data. The analysis apparatus sequentially outputs the generated analysis data.

12 Claims, 13 Drawing Sheets

| CHAPTER | C11 | C12 | C13 | C14 | C15 |
|---|---|---|---|---|---|
| LEVEL OF ATTENTION | 65 | 61 | 75 | 82 | 58 |
| LEVEL OF EMPATHY | 50 | 45 | 41 | 46 | 43 |
| LEVEL OF UNDERSTANDING | 43 | 32 | 33 | 66 | 51 |
| TOTAL SCORE | 158 | 138 | 149 | 194 | 152 |

| CHAPTER | C21 | C22 | C23 |
|---|---|---|---|
| LEVEL OF ATTENTION | 62 | 78 | 58 |
| LEVEL OF EMPATHY | 47 | 46 | 43 |
| LEVEL OF UNDERSTANDING | 35 | 48 | 51 |
| TOTAL SCORE | 144 | 172 | 152 |

ANALYSIS APPARATUS, ANALYSIS SYSTEM, ANALYSIS METHOD, AND NON-TRANSITORY COMPUTER READABLE MEDIUM STORING PROGRAM

This application is a National Stage Entry of PCT/JP2020/038528 filed on Oct. 12, 2020, the contents of all of which are incorporated herein by reference, in their entirety.

TECHNICAL FIELD

The present disclosure relates to an analysis apparatus, an analysis system, an analysis method, and a non-transitory computer readable medium storing a program.

BACKGROUND ART

In accordance with a recent increase in the number of online meetings, systems for efficiently holding or supporting the online meetings have been developed.

For example, Patent Literature 1 discloses a meeting support system that supports management of meetings in an organization for the purpose of making the contents of the meetings useful as an asset and efficiently conducting the management of the meetings. The meeting support system disclosed in Patent Literature 1 includes a video meeting apparatus, an image recognition unit, a voice recognition unit, and a timeline management unit. The video meeting apparatus is an apparatus for enabling online video meeting among a plurality of places and the image recognition unit recognizes images related to each participant from video data acquired from the aforementioned video meeting apparatus by an image recognition technique. The voice recognition unit acquires voice data of each of the participants by the aforementioned video meeting apparatus. The voice recognition unit identifies, based on a comparison between the voice data and feature information of the voice of each of the participants registered in advance and information on a motion of each of the participants acquired by the aforementioned image recognition unit, the speaker of each speech in the voice data. The timeline management unit outputs voice data of each of the participants acquired by the aforementioned voice recognition unit as a time line in a time series of speeches.

Further, in the technique disclosed in Patent Literature 1, various aspects of the content of the meeting are evaluated and scored in real time or after the meeting, the evaluation score of the overall meeting is displayed at the center of a screen, and an evaluation score for each item is displayed near the evaluation score of the overall meeting.

CITATION LIST

Patent Literature

[Patent Literature 1] Japanese Unexamined Patent Application Publication No. 2019-061594

SUMMARY OF INVENTION

Technical Problem

However, in the technique disclosed in Patent Literature 1, since a number of evaluation scores regarding the online meeting are displayed in real time, some participants may feel that too much information is being presented. In this case, it cannot be expected that the participants' behavior will be changed and it becomes difficult for the participants to focus on the meeting.

The present disclosure has been made in view of the aforementioned problem and an aim of the present disclosure is to provide an analysis apparatus and the like capable of outputting an evaluation for an online meeting in real time in such a way that participants who see this evaluation may change their behavior while without their ability to focus on the online meeting being disrupted.

Solution to Problem

An analysis apparatus according to a first aspect of the present disclosure includes emotion data acquisition means, analysis data generation means, and output means. The emotion data acquisition means sequentially acquires emotion data generated for each first period based on face image data of participants during an online meeting. The analysis data generation means generates analysis data indicating one analysis value regarding an evaluation for a second period in an ongoing online meeting based on the emotion data including at least the latest data. The output means sequentially outputs the analysis data generated by the analysis data generation means.

An analysis method according to a second aspect of the present disclosure causes a computer to sequentially acquire emotion data generated for each first period based on face image data of participants during an online meeting. This analysis method causes the computer to generate analysis data indicating one analysis value regarding an evaluation for a second period in an ongoing online meeting based on the emotion data including at least the latest data; and sequentially output the generated analysis data.

A non-transitory computer readable medium according to a third aspect of the present disclosure is a non-transitory computer readable medium storing an analysis program for causing a computer to execute the following first, second, and third processing. The above first processing is processing for sequentially acquiring emotion data generated for each first period based on face image data of participants during an online meeting. The above second processing is processing for generating analysis data indicating one analysis value regarding an evaluation for a second period in an ongoing online meeting based on the emotion data including at least the latest data. The above third processing is processing for sequentially outputting the generated analysis data.

Advantageous Effects of Invention

According to the present disclosure, it is possible to provide an analysis apparatus and the like capable of outputting an evaluation for an online meeting in real time in such a way that participants who see this evaluation may change their behavior while without their ability to focus on the online meeting being disrupted.

EXAMPLE EMBODIMENT

In the following, with reference to the drawings, example embodiments of the present disclosure will be described in detail. Throughout the drawings, the same or corresponding elements are denoted by the same reference symbols and overlapping descriptions will be omitted as necessary for the sake of clarification of the description.

First Example Embodiment

Figure 1:
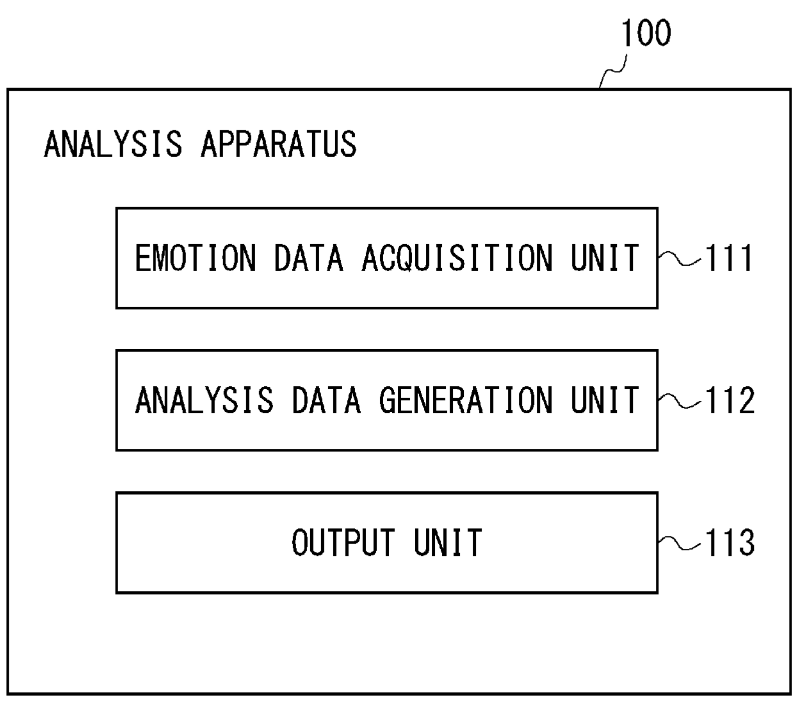
FIG. 1 is a block diagram showing a configuration example of an analysis apparatus according to a first example embodiment.
Figure 2:
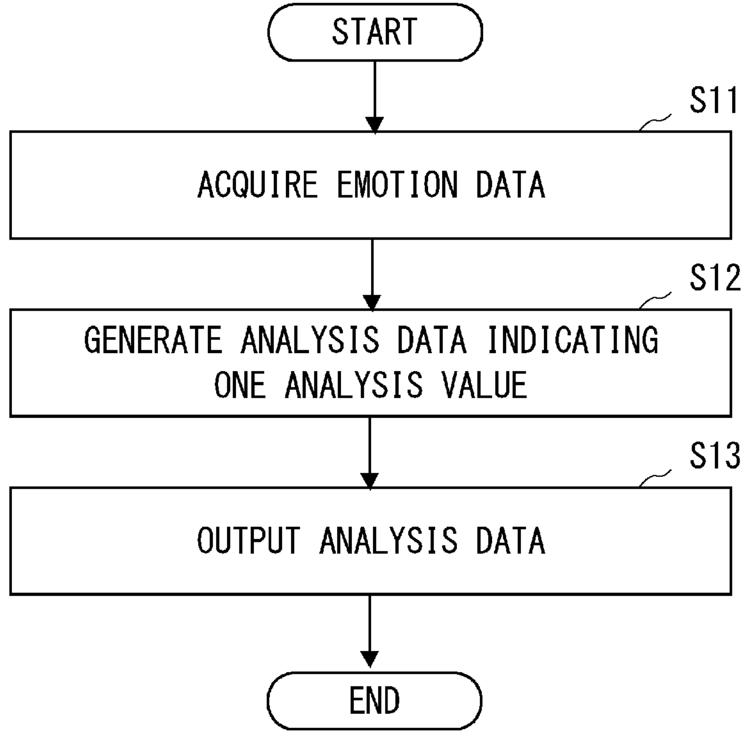
FIG. 2 is a flowchart showing an analysis method according to the first example embodiment.

With reference to FIGS. 1 and 2, a first example embodiment will be described. FIG. 1 is a block diagram showing a configuration example of an analysis apparatus according to the first example embodiment.

As shown in FIG. 1, an analysis apparatus 100 according to this example embodiment includes an emotion data acquisition unit (emotion data acquisition means) 111, an analysis data generation unit (analysis data generation means) 112, and an output unit (output means) 113 and generates analysis data regarding an online meeting and outputs the generated analysis data.

In this example embodiment, the term "online meeting" means any meeting that is held using a plurality of meeting terminals connected to one another via a communication line in such a way that these meeting terminals can communicate with one another. The online meeting may be held remotely and may be, for example, a Webinar event, education and corporate training, or a small-group meeting. The meeting terminal connected to the online meeting may be, for example, a Personal Computer (PC), a smartphone, a tablet terminal, or a mobile phone equipped with a camera. Further, the meeting terminal is not limited to the aforementioned ones as long as it is an apparatus including a camera that captures images of participants, a microphone that collects speeches of the participants, and a communication function that transmits and receives image data or voice data. In the following description, the online meeting may be simply referred to as a "meeting".

The participants of the online meeting in this example embodiment indicate persons who access the online meeting via the meeting terminals and include the host of the meeting, speakers or presenters of the meeting, and observers of the meeting. When, for example, a plurality of persons participate in the meeting via one meeting terminal, each of these plurality of persons is a participant. In this example embodiment, it is assumed that the participants participate in the meeting in a state in which their face images can be captured by cameras included in the meeting terminals or connected to the meeting terminals.

The emotion data acquisition unit 111 sequentially acquires emotion data generated for each first period based on face image data of a participant during the online meeting. In order to acquire the emotion data, the analysis apparatus 100 can be connected to each of an emotion data generation apparatus that generates emotion data of participants in the online meeting and a meeting management apparatus that manages the online meeting in such a way that the analysis apparatus 100 can communicate with the emotion data generation apparatus and the meeting management apparatus. Further, the analysis apparatus 100 can be connected to a terminal (user terminal) that the user who uses the analysis apparatus 100 has in such a way that the apparatus 100 can communicate with the terminal, and the user terminal may be the final output destination of the analysis data that will be described later.

The emotion data generation apparatus may be configured to be connected to the meeting management apparatus in such a way that the emotion data generation apparatus can communicate with the meeting management apparatus, receive face image data of the participants of the meeting in the online meeting, generate the emotion data from this face data, and supply the generated emotion data to the analysis apparatus 100. Accordingly, the emotion data acquisition unit 111 is able to acquire the emotion data from the emotion data generation apparatus.

The emotion data is data that serves as indices indicating emotions that each of the participants of the meeting has. The emotion data includes, for example, a plurality of items (a plurality of kinds of items) such as a level of attention, a level of confusion, a level of happiness, and surprise. The data in the respective items are numerical values of the indices indicating the respective kinds of the emotions. That is, the emotion data shows the extent to which the participant is feeling these kinds of emotions for each of the aforementioned items. As described above, the emotion data is the data in which the states of the plurality of kinds of emotions are indicated by numerical values. In other words, the emotion data is the data in which a plurality of indices indicating the states of the emotion are indicated by numerical values. It can be said that this emotion data is expression data indicating reactions (behavior) expressed by participants during the online meeting, and may be the one generated in view of voice data as well as the face image data.

The emotion data acquired by the emotion data acquisition unit 111 may be the one that includes time data. The emotion data generation apparatus generates emotion data for each first period. The first period may indicate, for example, a predetermined time such as one second or one minute. The emotion data acquisition unit 111 acquires emotion data for each first period along the proceeding time of the meeting. Upon acquiring the emotion data, the emotion data acquisition unit 111 supplies the acquired emotion data to the analysis data generation unit 112.

The analysis data generation unit 112 generates analysis data indicating one analysis value regarding an evaluation for a second period in an ongoing online meeting based on the supplied emotion data including at least the latest data. The evaluation here may be an evaluation for the meeting so that a value may vary depending on the difference between emotion data items, and the method of calculating the evaluation value is not limited as long as one analysis value (value of one index) is calculated as the evaluation value indicating the evaluation.

Further, the analysis data generation unit 112 generates the analysis data for each second period based on the emotion data including at least the latest data. Therefore, the second period means a period including the latest timing and the analysis means real-time processing in accordance with the timing when the emotion data is supplied.

The second period may indicate, for example, a period from the timing when the ongoing online meeting was started to the current time (actually, a last time the emotion data was acquired). In this case, it is possible to generate analysis data from the start of the meeting to the current time. Alternatively, the second period may indicate, for example, a period from a timing a predetermined time before the current time, such as one second or one minute, up to the current time, that is, a certain period of time up to a last time the emotion data in the ongoing online meeting was acquired. In this case, it is possible to generate the analysis data a predetermined period before to the current time. The period to be adopted as the second period may be determined in advance.

As described above, the analysis data generation unit 112 generates the analysis data for each second period. The output unit 113 sequentially outputs the analysis data generated in the analysis data generation unit 112. That is, the output unit 113 outputs the analysis data in real time every time the second period is ended.

It is preferable, in particular, that the output unit 113 sequentially output the analysis data to the system that provides the ongoing online meeting in such a way that the analysis data can be superimposed on the screen of the ongoing online meeting. The system that provides the online meeting may include the aforementioned meeting management apparatus. When the analysis data is output to this meeting management apparatus, the analysis data may be superimposed on the screen of the online meeting. Alternatively, the output unit 113 may be configured to output the analysis data generated by the analysis data generation unit 112 in such a way that it may be superimposed on the display image of the user terminal. In this case, the user directly uses the analysis apparatus 100. In either case, in order to output the analysis data in such a way that it is superimposed on the screen of the online meeting, for example, the analysis data may be formed of a signal having a format that allows the analysis data to be superimposed on the meeting screen in the meeting management apparatus or the analysis data may simply be formed of an On Screen Display (OSD) signal.

Regardless of which output destination is adopted in the output unit 113, the user is able to eventually perceive one analysis value that the user terminal has received, thereby recognizing one analysis value (analysis data) in which the meeting that is being held is evaluated, that is, recognizing the evaluation for the meeting. In particular, since the output analysis data is data in which the ongoing online meeting is indicated by one index by, for example, an overall average, the user can easily know the evaluation for the meeting. Therefore, the user is able to know whether he/she should change his/her attitude toward the following participation in the ongoing online meeting from the received analysis data and to participate in the following meeting in view of the matters and the like that should be noted. Further, according to this example embodiment, since the analysis data formed of one analysis value is output, it is possible to prevent participants from disrupting their ability to focus on the online meeting.

Referring next to FIG. 2, processing of the analysis apparatus 100 according to the first example embodiment will be described. FIG. 2 is a flowchart showing an analysis method according to the first example embodiment. The flowchart shown in FIG. 2 can be started by the analysis apparatus 100 receiving, for example, a signal indicating the start of the meeting from the meeting management apparatus or an equivalent signal from the emotion data generation apparatus.

First, the emotion data acquisition unit 111 sequentially acquires the emotion data from the emotion data generation apparatus (Step S11). The emotion data acquisition unit 111 is able to acquire the generated emotion data every time the emotion data generation apparatus generates the emotion data.

Next, the analysis data generation unit 112 generates analysis data indicating one analysis value regarding an evaluation for a second period in the ongoing online meeting based on the emotion data including at least the latest data received from the emotion data acquisition unit 111 (Step S12). Next, the output unit 113 sequentially outputs the generated analysis data (Step S13).

The first example embodiment has been described above. As described above, the analysis apparatus 100 according to the first example embodiment acquires emotion data of the participants in the ongoing online meeting, generates the analysis data indicating one analysis value (analysis data indicated by one analysis value), and outputs the generated analysis data. Accordingly, the user is able to recognize the analysis data of the ongoing online meeting, that is, recognize the evaluation for the meeting, know whether or not he/she should change his/her attitude toward the following participation, and participate in the following meeting in view of the matters and the like that should be noted. For example, the user is able to change the level of communication so as to achieve smooth communication using the provided analysis data in the meeting that is being held. Further, according to the first example embodiment, the analysis data formed of one analysis value is output, whereby it is possible to prevent participants from disrupting their ability to focus on the online meeting.

Therefore, according to this example embodiment, it is possible to provide an analysis apparatus and the like capable of outputting an evaluation for an online meeting in real time in such a way that participants who see this evaluation may change their behavior while without their ability to focus on the online meeting being disrupted. According to this effect, in this example embodiment, it is possible to efficiently manage the online meeting.

The analysis apparatus 100 includes a processor and a storage apparatus as components that are not shown. The storage apparatus included in the analysis apparatus 100 includes a storage apparatus including a non-volatile memory such as a flash memory or a Solid State Drive (SSD). In this case, the storage apparatus included in the analysis apparatus 100 stores the emotion data or the analysis data temporarily or semi-permanently.

The storage apparatus that the analysis apparatus 100 includes may store a computer program (hereinafter it may also be simply referred to as a program) for executing the analysis method according to this example embodiment. Further, the processor loads a computer program into a memory from a storage apparatus and executes this program.

Each of the components that the analysis apparatus 100 includes may be implemented by dedicated hardware. Further, some or all of the components may each be implemented by general-purpose or dedicated circuitry, processor, or a combination of them. They may be configured using a single chip, or a plurality of chips connected through a bus. Some or all of the components of each apparatus may be implemented by a combination of the above-described circuitry, etc. and a program. Further, a Central Processing Unit (CPU), a Graphics Processing Unit (GPU), a field-programmable gate array (FPGA) and so on may be used as a processor.

Further, when some or all of the components of the analysis apparatus 100 are implemented by a plurality of computation apparatuses, circuits, or the like, the plurality of computation apparatuses, the circuits, or the like may be disposed in one place in a centralized manner or arranged in a distributed manner. For example, the computation apparatuses, the circuits, and the like may be implemented as a form such as a client-server system, a cloud computing system or the like in which the apparatuses or the like are connected to each other through a communication network. Alternatively, the functions of the analysis apparatus 100 may be provided in the form of Software as a Service (SaaS).

Second Example Embodiment

Figure 3:
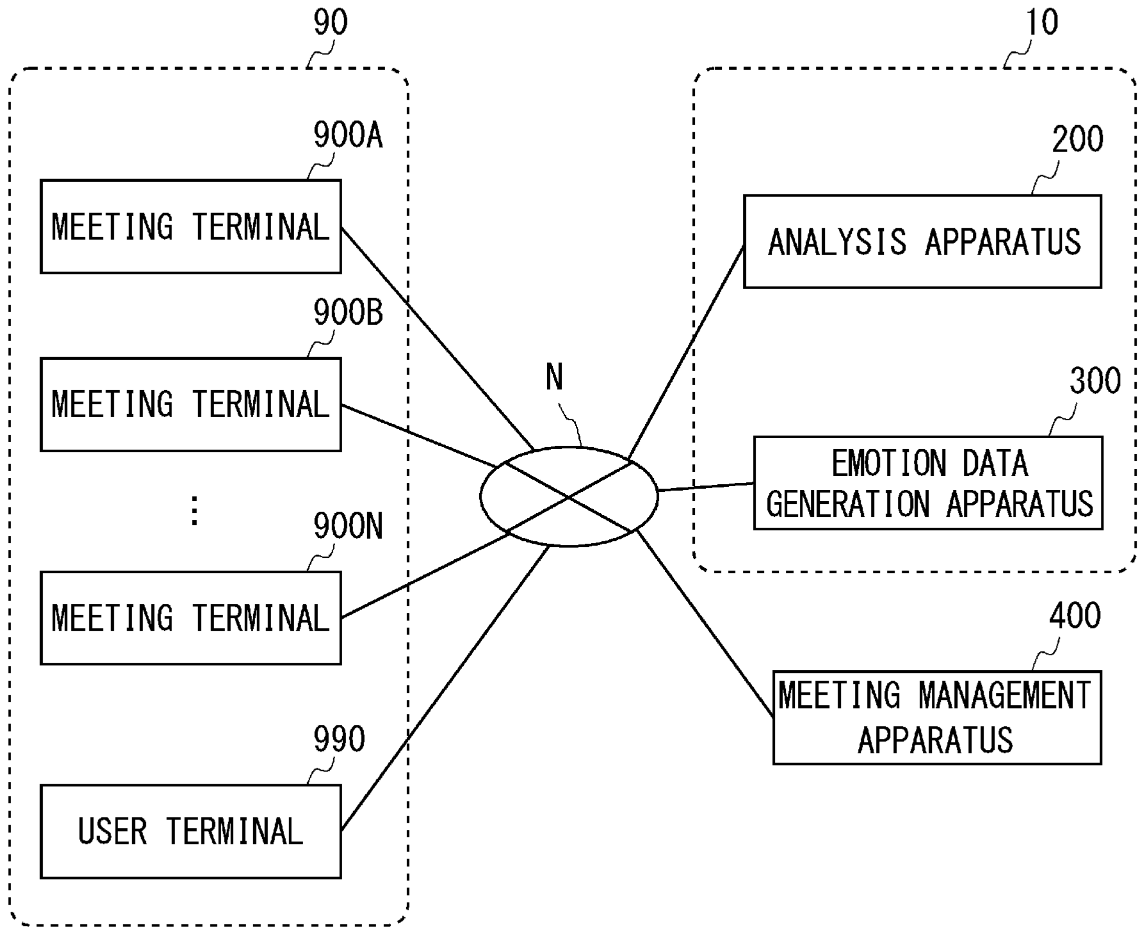
FIG. 3 is a block diagram showing a configuration example of an analysis system according to a second example embodiment.

While a second example embodiment will be described, focusing on the differences from the first example embodiment, various examples described in the first example embodiment can be applied to the second example embodiment. FIG. 3 is a block diagram showing a configuration example of an analysis system according to the second example embodiment.

As shown in FIG. 3, an analysis system 10 according to this example embodiment may include an analysis apparatus 200 and an emotion data generation apparatus 300 that generates emotion data and provides the emotion data for the analysis apparatus 200. The analysis apparatus 200 and the emotion data generation apparatus 300 are connected to each other via a network N in such a way that they can communicate with each other. Further, the analysis system 10 is connected to a meeting management apparatus 400 via the network N in such a way that the analysis system 10 can communicate with the meeting management apparatus 400. The meeting management apparatus 400 is connected to a meeting terminal group 90 via the network N and manages an online meeting. The meeting terminal group 90 includes a plurality of meeting terminals (900A, 900B, . . . , 900N) and a user terminal 990.

While the user terminal described in the first example embodiment may be the meeting terminal 900A or the like, another user terminal 990 that is not used as a meeting terminal may be used by the user together with the meeting terminal. In this case, the analysis data may be output to the user terminal 990 and the user can check the analysis data using the user terminal 990 while participating in the meeting with the meeting terminal.

Figure 4:
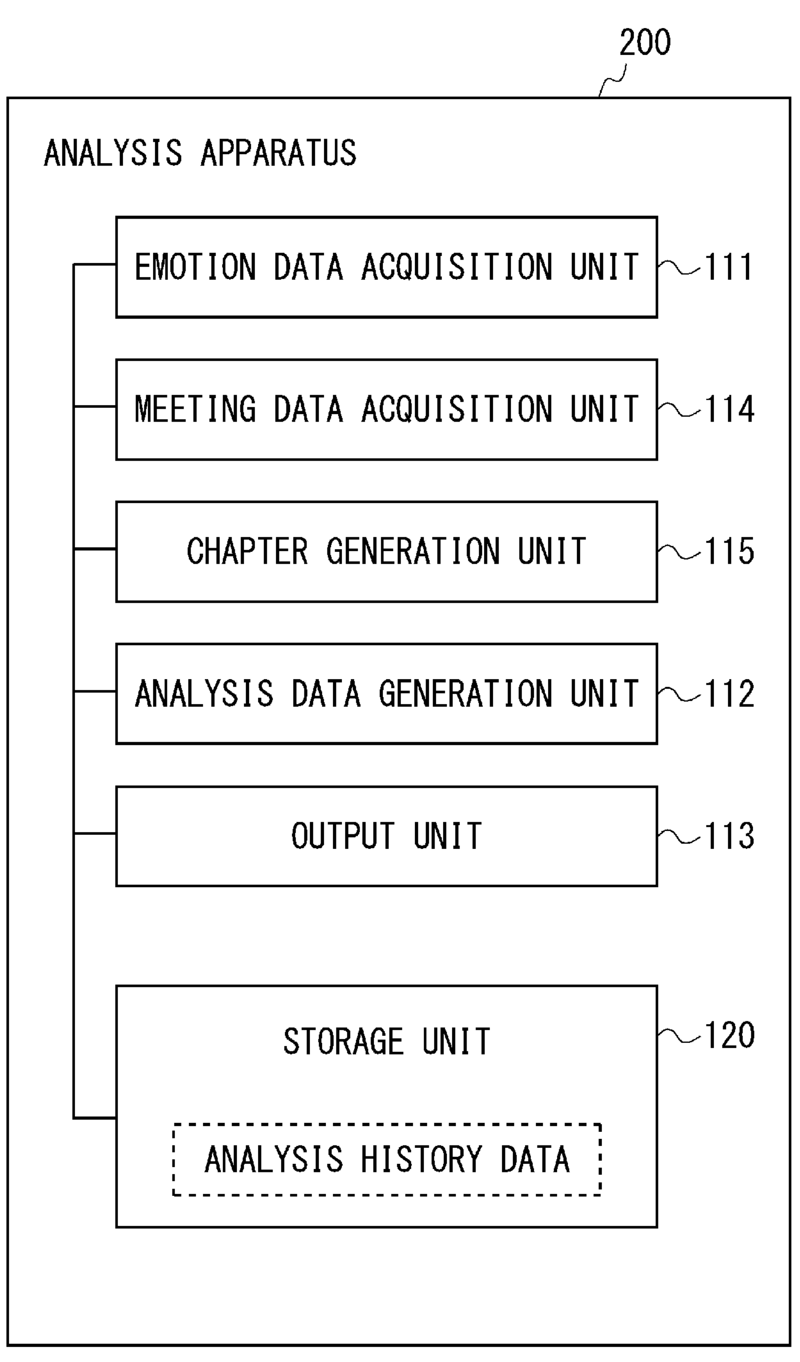
FIG. 4 is a block diagram showing a configuration example of an analysis apparatus according to the second example embodiment.

Referring next to FIG. 4, an analysis apparatus according to the second example embodiment will be described. FIG. 4 is a block diagram showing a configuration example of the analysis apparatus 200 according to the second example embodiment. The analysis apparatus 200 according to the second example embodiment is different from the analysis apparatus 100 according to the first example embodiment in that the analysis apparatus 200 includes a meeting data acquisition unit 114, a chapter generation unit 115, and a storage unit 120. Hereinafter, each of the components of the analysis apparatus 200 will be described, including differences between the analysis apparatus 200 and the analysis apparatus 100.

An emotion data acquisition unit 111 sequentially acquires the emotion data generated for each first period based on face image data of participants during an online meeting.

An analysis data generation unit 112 generates analysis data indicating one analysis value regarding an evaluation for a second period in an ongoing online meeting based on emotion data including at least the latest data received from the emotion data acquisition unit 111.

The storage unit 120 stores the analysis data generated in the analysis data generation unit 112 as analysis history data. The storage unit 120 may be a storage apparatus including a non-volatile memory such as a Solid State Drive (SSD) or a flash memory. The storage unit 120 stores, for example, besides the aforementioned data, a program and the like for executing the analysis method according to this example embodiment.

By using the analysis history data, the analysis data generation unit 112 is able to calculate one analysis value for the second period for which the analysis data is generated as a relative value shown below.

For example, this relative value may be a relative value for a statistical value of a past analysis value (analysis value regarding the past second period) indicated by one analysis history data item or past analysis values indicated by a plurality of analysis history data items regarding the ongoing online meeting. The statistical value may be any value obtained by any statistical method and may be a simple average value, a simple moving average value, a weighted moving average value, an exponential moving average value, or a median value. Preferably, a method that may be suitable for a meeting evaluation based on emotion data is employed.

Further, the above relative value may be a difference value, a rate or the like indicating an increase or a decrease with respect to a past value. For example, in one ongoing online meeting, the relative value may be calculated as a value indicating how far the evaluation has increased or decreased compared to the evaluation obtained 10 seconds ago. When the relative value is calculated, the analysis history data may include not only the calculated relative value but also an absolute value at the time of calculation of the relative value, the absolute value being used to calculate the relative value. The analysis data generation unit 112 is able to generate the analysis data from the absolute value at the timing when the analysis data is generated and the absolute value included in the analysis history data as a relative value between these absolute values.

Further, another example of the relative value may be a relative value using analysis history data regarding a previously-held online meeting that has been held before the ongoing online meeting. More specifically, the relative value to be calculated may be a relative value for a past analysis value indicated by one analysis history data item regarding one previously-held online meeting. Alternatively, the relative value to be calculated may be a relative value for the statistical value of past analysis values indicated by a plurality of analysis history data items regarding one or more previously-held online meetings. In this example as well, as described above, the statistical value may be any value obtained by using any statistical method. Further, the relative value may be a difference value, a rate or the like with respect to the past analysis value.

The output unit 113 sequentially outputs the generated analysis data. Then, the relative value is used as the analysis data to be output, whereby the user is therefore able to recognize the evaluation for the meeting that is being held as a relative comparison with past data even though the user does not know the absolute index since the ongoing online meeting is indicated by one index such as an overall average.

Further, the emotion data that is used to generate the analysis data may include attribute data indicating the attribute (kind) of the target online meeting. The attribute data of the meeting may include, for example, information indicating the type of the meeting such as Webinar, a regular meeting, or brainstorming. The attribute data of the meeting may also include information regarding the type of business of the company for which participants of the meeting work or the categories of the job of these participants. The attribute data of the meeting may also include information regarding the theme of the meeting, the purpose of the meeting, or the name of a meeting group.

The analysis data generation unit 112 may be configured to generate the analysis data in accordance with the attribute data regarding the ongoing online meeting. For example, different analysis values may be calculated for different attributes. In the example in which the analysis data is generated using the analysis history data, only the analysis history data regarding attributes the same as those of the online meeting whose analysis data is to be generated may be used. Alternatively, the analysis history data for each attribute may be used by adding different weights for the same attributes, similar attributes, completely different attributes or the like.

The meeting data acquisition unit 114 sequentially acquires meeting data regarding the online meeting that includes time data from the meeting management apparatus 400. The meeting management apparatus 400 is, for example, a server apparatus that each of the participants of the meeting accesses in such a way that communication can be performed between them. The meeting management apparatus 400 may be the one included in the meeting terminal 900A and the like used by the participants of the meeting. The meeting data, which is data regarding the meeting that includes time data, may include face image data of the participants captured during the meeting. More specifically, the meeting data includes the start time and the end time of the meeting. The meeting data further includes a time of a break taken during the meeting. The aforementioned attribute data may be included in this meeting data. In this case, the meeting data (including attribute data) and the emotion data may be associated with each other by the time data. That is, the attribute data may be configured in such a way that the meeting data acquisition unit 114 acquires meeting data including the attribute data of the meeting from the meeting management apparatus 400 that manages the meeting.

The meeting data acquisition unit 114 may be the one that acquires meeting data including data regarding screen sharing in the meeting. In this case, the meeting data may include, for example, a time when the authority to operate the shared screen shared by the participants (owner of the shared screen) is switched or a time when the speech of the participant is switched. The meeting data acquisition unit 114 may acquire meeting data including screen data shared in the meeting. In this case, the meeting data may include a time when a page is forwarded in the shared screen or when a display image is changed. Further, the meeting data may include information indicating what each of the aforementioned times shows. The meeting data acquisition unit 114 supplies the acquired meeting data to the chapter generation unit 115 that will be described later and the analysis data generation unit 112.

The chapter generation unit 115 generates chapters for the online meeting based on the meeting data received from the meeting data acquisition unit 114. The chapter generation unit 115 supplies the data indicating the generated chapters to the analysis data generation unit 112. Accordingly, it becomes possible to use the chapters to determine the second period, although it will be described later.

The chapter generation unit 115 detects, for example, the time from the start of the meeting to the current time, further detects times that meet a preset condition, and generates data indicating the chapters with each time as a delimiter. A simple example of this condition may be, but not limited to, whether a multiple of a predetermined time has passed since the start time. The chapters of the meeting in the present disclosure may be defined based on whether a state in which the predetermined condition is met has been maintained in the meeting or the predetermined condition has been changed.

The chapter generation unit 115 may further generate chapters based on, for example, data regarding screen sharing. More specifically, the chapter generation unit 115 may generate a chapter in accordance with a timing when the screen sharing is switched. Further, the chapter generation unit 115 may generate a chapter in accordance with a time when the owner of the shared screen in the screen sharing is switched.

The analysis data generation unit 112 generates the analysis data for each second period from the received emotion data and data indicating the chapters. In this example, the second period may be defined as a period from the start time to the end time regarding a chapter group formed of one chapter or a plurality of successive chapters generated by the chapter generation unit 115. That is, the analysis data generation unit 112 is able to generate the analysis data regarding the meeting for each chapter or for each chapter group based on the emotion data.

As described in the first example embodiment, the emotion data may be the one showing each of the states of the plurality of kinds of emotions by numerical values. That is, the emotion data acquisition unit 111 may be configured to acquire the emotion data in which a plurality of indices indicating the states of the emotions are indicated by numerical values.

In this case, the analysis data may be data that is derived from the aforementioned emotion data and is extracted or calculated from the numerical values of the indices indicating the plurality of kinds of emotions. The analysis data generation unit 112 is able to generate analysis data indicating one analysis value by calculating the statistical value of the emotion data. The generated analysis data is preferably an index that helps to manage the meeting. For example, the analysis data may be an analysis value indicating any one of the level of attention, the level of empathy, and the level of understanding for the meeting or may be one analysis value calculated therefrom (e.g., a value indicating the level of reactions to the meeting). Alternatively, the analysis data may be the level of transmission of emotions of the speaker to the observers of the meeting. Upon generating the analysis data for each chapter, the analysis data generation unit 112 supplies the generated analysis data to the output unit 113.

The analysis data generation unit 112 may generate analysis data so as to determine, based on a predetermined condition regarding significance or predominance among numerical values indicating the states of the plurality of kinds of emotions, the color tone added to one analysis value and express one analysis value by adding the determined color tone. It is assumed here that the color tone is a color tone that is based on indices preset for the respective states of the plurality of kinds of emotions. For example, a case in which one analysis value indicated by the analysis data is a numerical value indicating the level of reactions calculated from the numerical value indicating the level of attention, the numerical value indicating the level of empathy, and the numerical value indicating the level of understanding and the numerical value indicating the level of attention is more significant or dominant than the other ones will be described as an example. In this case, the analysis data may be generated in such a way that the numerical value indicating the level of reactions is expressed by a predetermined color tone for the level of attention.

Figure 5:
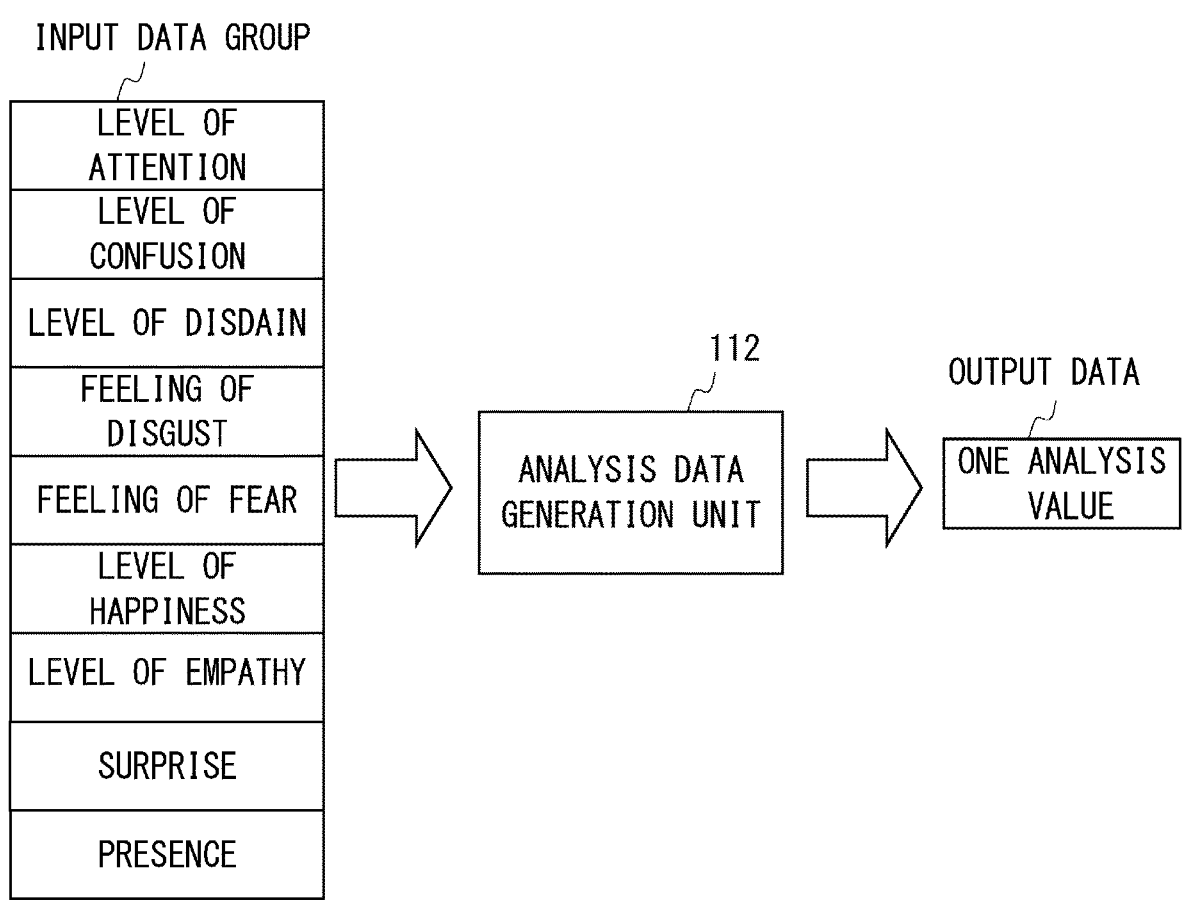
FIG. 5 is a diagram showing a first example of data processed by an analysis data generation unit.

Referring now to FIG. 5, a processing example of the analysis data generation unit 112 will be further described. FIG. 5 is a diagram showing an example of data processed by the analysis data generation unit 112. FIG. 5 shows an input data group received by the analysis data generation unit 112 and output data (analysis data) that the analysis data generation unit 112 outputs. The analysis data generation unit 112 receives emotion data as the input data group from the emotion data generation apparatus 300. The input data group includes, for example, respective indices regarding a level of attention, a level of confusion, a level of disdain, a feeling of disgust, a feeling of fear, a level of happiness, a level of empathy, surprise, and presence. These indices are indicated, for example, by numerical values from 0 to 100. The emotion data of the input data group acquired may be the one generated from the face image data using the existing video processing technique or may be generated or acquired by another method.

Upon receiving the aforementioned input data group, the analysis data generation unit 112 performs preset processing and generates output data using the input data group. The output data is data indicating one analysis value that the user who uses the analysis system 10 refers to in order to efficiently conduct a meeting. The analysis data generation unit 112 extracts the preset index from the input data group. The analysis data generation unit 112 further performs preset computation processing on the value of the extracted index. The analysis data generation unit 112 then generates the aforementioned output data. The output data may be data indicating the value of one item included in the input data group (e.g., the level of attention).

Further, the emotion data acquired by the emotion data acquisition unit 111 may include individual emotion data for each participant. In this case, the analysis data generation unit 112 may be configured to generate, for each of the participants, analysis data based on the individual emotion data including at least the latest data.

As described above, it is preferable that the output unit 113 sequentially output the analysis data to the system for providing the ongoing online meeting (including the meeting management apparatus) in such a way that the analysis data can be superimposed on the screen of the ongoing online meeting. In this case as well, by providing information for identifying a person for the meeting management apparatus, it is possible to cause the user terminal of each person to output the analysis data of this person to the screen of the online meeting of the corresponding user terminal. Further, as described above, the output unit 113 can be configured so as to output the analysis data generated by the analysis data generation unit 112 to the user terminal. The user uses the analysis apparatus 100.

Regardless of which output destination is adopted in the output unit 113, the user is able to eventually recognize the analysis data on the user terminal. That is, since the user perceives analysis data of himself/herself that the user terminal has received, the user is able to recognize the analysis data (evaluation) for himself/herself in the meeting in which he/she participates. Therefore, the user is able to know, from the received analysis data, whether he/she should change his/her attitude toward the following participation in the ongoing online meeting and participate in the following meeting in view of the matters and the like that should be noted.

Further, another example in which the emotion data includes individual emotion data for each participant may be as follows. That is, the analysis data generation unit 112 may be configured to add a weight to individual emotion data for a presenter included in the participants different from a weight added to individual emotion data for the other participants and generate analysis data. Accordingly, it is possible to generate analysis data in a state in which the presenter and the other participants are distinguished from each other or generate the analysis data for each participant in the state in which the presenter and the other participants are distinguished from each other.

Further, another example in which the emotion data includes individual emotion data for each participant may be as follows. That is, the emotion data may include individual emotion data for each participant and data of segmentation to which the participant belongs. The segmentation of the participant here is, for example, the legal entity to which the participant belongs, the department in the legal entity, the category of the job or the like of the participant.

In this case, the analysis data generation unit 112 may be configured to generate, for each participant, analysis data based on the individual emotion data including at least the latest data and the segmentation data (i.e., in view of the segmentation). Accordingly, it is possible to generate the analysis data for each participant in view of the segmentation of the participant.

Like in the aforementioned examples, it is possible to cause the emotion data acquired by the emotion data acquisition unit 111 to include the individual emotion data for each participant to perform various kinds of processing. The individual emotion data is generated by the emotion data generation apparatus 300, that is, the emotion data generation apparatus 300 communicatively connected to the meeting management apparatus 400 is able to specify the person from the meeting data or the like and generate the emotion data that includes the individual emotion data.

Figure 6:
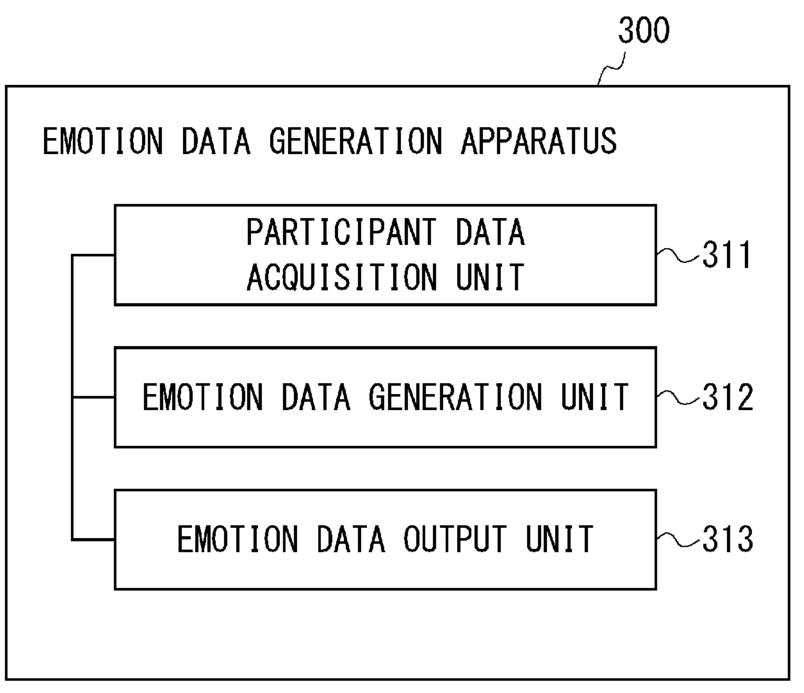
FIG. 6 is a block diagram showing a configuration example of an emotion data generation apparatus according to the second example embodiment.

Referring next to FIG. 6, the emotion data generation apparatus 300 will be described. FIG. 6 is a block diagram showing a configuration of the emotion data generation apparatus according to the second example embodiment. The emotion data generation apparatus 300 mainly includes a participant data acquisition unit 311, an emotion data generation unit 312, and an emotion data output unit 313.

The participant data acquisition unit 311 acquires data regarding the participants from the meeting management apparatus 400 via the network N. The data regarding the participants is face image data of the participants that the meeting terminal has captured during the meeting. When the face image data is included in the meeting data, the meeting management apparatus 400 is able to extract, for example, the face image data from the meeting data and transmit the extracted face image data to the emotion data generation apparatus 300.

The emotion data generation unit 312 generates the emotion data from the face image data received by the emotion data generation apparatus 300. The emotion data output unit 313 outputs the emotion data generated by the emotion data generation unit 312 to the analysis apparatus 200 via the network N. The emotion data generation apparatus 300 generates the emotion data by performing predetermined image processing on the face image data of the participants. The predetermined image processing is, for example, extraction of feature points (or feature amount), comparison between the extracted feature points with reference data, convolution processing of image data and processing using machine-learned teaching data, processing using teaching data by deep learning or the like. Note that the method in which the emotion data generation apparatus 300 generates the emotion data is not limited to the aforementioned processing. The emotion data may be numerical values, which are indices indicating emotions, or may include the one including image data used when the emotion data is generated.

In the example in which the emotion data to be generated does not include the individual emotion data, that is, when, for example, the individual emotion data is not used to generate analysis data, like in the analysis apparatus 100 shown in FIG. 1, it is sufficient that emotion data be generated from the face image data without differentiating between persons. As one example, it is possible to count the number of people with large numerical values for each item such as the level of attention from the face image data of a plurality of persons to generate emotion data formed of each of the count values. However, this is merely one example.

On the other hand, in the example in which the emotion data to be generated includes the individual emotion data, the following processing may be performed. In this case, the face image data of the participants captured by the meeting terminals during the meeting may be received as data regarding the participants and face authentication processing based on face image data registered in advance may be executed so that the individual participants may be identified and the individual emotion data may be generated from the face image data of each of the participants. Further, even when the individual participants are not identified, the same person can be identified from the face image data of the participants captured during the meeting. It is therefore possible to generate the individual emotion data. In the example in which there is one user for one meeting terminal, it is possible to identify a person by only log-in information when the user participates in the meeting and generate the individual emotion data of this person from the face image data captured by this meeting terminal.

Further, when the data of the segmentation to which each participant belongs is included in the emotion data, the segmentation of the participant may be generated from, for example, the person attribute data. This person attribute data is data in which the face feature information of the person and information regarding the segmentation or the attribute of the person are associated with each other, and may be stored in the emotion data generation apparatus 300 or an apparatus that the emotion data generation apparatus 300 can access in advance. The information regarding the segmentation or the attribute of the person includes, for example, but not limited to, the name of the person, the sex of the person, the age of the person, the category of the job, the legal entity or the department to which this person belongs. Further, the segmentation of the participant may be estimated in accordance with information obtained by extracting face feature information of the person who is in the face image (information on feature points) from the face image data.

The emotion data generation apparatus 300 includes, as components that are not shown, a processor and a storage apparatus. The storage apparatus included in the emotion data generation apparatus 300 stores a program for executing generation of the emotion data according to this example embodiment. Further, the processor loads a program into a memory from a storage apparatus and executes this program.

Each of the components that the emotion data generation apparatus 300 includes may be implemented by dedicated hardware. Further, some or all of the components may each be implemented by general-purpose or dedicated circuitry, processor, or a combination of them. They may be configured using a single chip, or a plurality of chips connected through a bus. Some or all of the components of each apparatus may be implemented by a combination of the above-described circuitry, etc. and a program. Further, a CPU, a GPU, a FPGA and so on may be used as a processor.

Further, when some or all of the components of the emotion data generation apparatus 300 are implemented by a plurality of computation apparatuses, circuits, or the like, the plurality of computation apparatuses, the circuits, or the like may be disposed in one place in a centralized manner or arranged in a distributed manner. For example, the computation apparatuses, the circuits and the like may be implemented as a form such as a client-server system, a cloud computing system or the like in which the apparatuses or the like are connected to each other through a communication network. Alternatively, the functions of the emotion data generation apparatus 300 may be provided in the form of SaaS.

Figure 7:
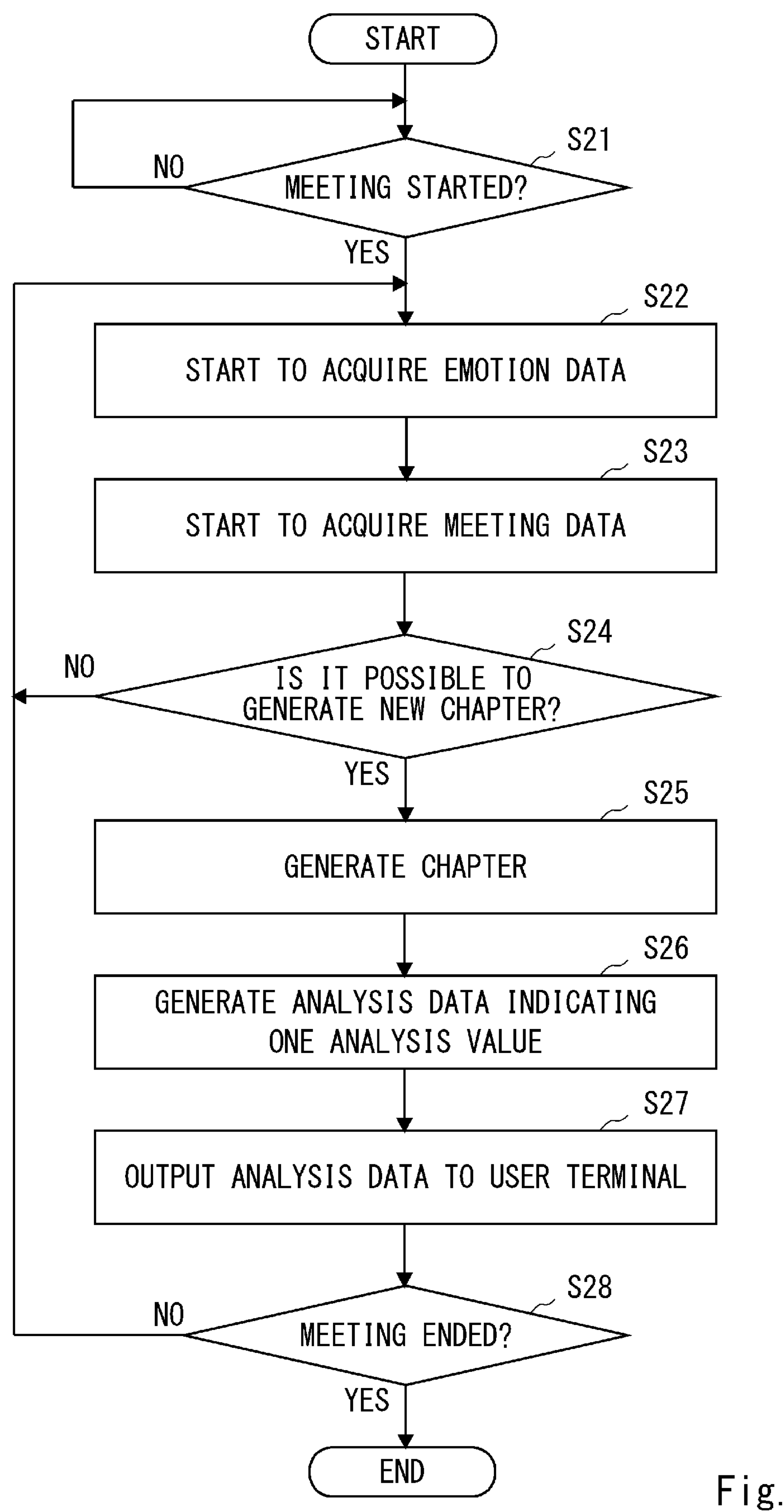
FIG. 7 is a flowchart showing an analysis method according to the second example embodiment.

Referring next to FIG. 7, an example of processing executed by the analysis apparatus 200 will be described. FIG. 7 is a flowchart showing the analysis method according to the second example embodiment. The processing shown in FIG. 7 is different from the processing according to the first example embodiment in that the second period is set as a period of a chapter in the meeting that is being held, that is, the analysis data is output every time a new chapter is generated.

First, the analysis apparatus 200 determines whether or not the online meeting has been started (Step S21). The analysis apparatus 200 determines that the meeting has been started by receiving a signal indicating that the meeting has been started from the meeting management apparatus 400. When it is not determined that the online meeting has been started (Step S21: NO), the analysis apparatus 200 repeats Step S21. When it has been determined that the online meeting has been started (Step S21: YES), the analysis apparatus 200 proceeds to Step S22.

In Step S22, the emotion data acquisition unit 111 starts to acquire the emotion data from the emotion data generation apparatus (Step S22). Next, the meeting data acquisition unit 114 acquires the meeting data regarding the meeting that includes time data from the meeting management apparatus (Step S23). The meeting data acquisition unit 114 may receive this meeting data for every first period or may receive the meeting data every time the meeting data includes information that should be updated. Further, Steps S22 and S23 may be started concurrently.

Next, the analysis apparatus 200 determines whether or not it is possible to generate a new chapter from the received meeting data (Step S24). When it is not determined that a new chapter can be generated (Step S24: NO), the analysis apparatus 200 returns to Step S22. On the other hand, when the analysis apparatus 200 has determined that it is possible to generate a new chapter (Step S24: YES), the analysis apparatus 200 proceeds to Step S25. In Step S25, the chapter generation unit 115 generates a chapter from the meeting data received from the meeting data acquisition unit 114 (Step S25).

Next, the analysis data generation unit 112 generates analysis data indicating one analysis value based on the emotion data received from the emotion data acquisition unit 111 regarding a period from the start to the end of the chapter or the chapter group received from the chapter generation unit 115 (Step S26). Needless to say, the received emotion data may include individual emotion data as well. The analysis data can be generated by taking into account the meeting data.

Next, the output unit 113 outputs the generated analysis data to the user terminal 990 (Step S27). Accordingly, the user is able to check the analysis data in real time. Further, the analysis apparatus 200 determines whether or not the meeting has ended (Step S28). The analysis apparatus 200 determines that the meeting has ended by receiving a signal indicating that the meeting has ended from the meeting management apparatus 400. When it is not determined that the meeting has ended (Step S28: NO), the analysis apparatus 200 returns to Step S22 and continues the processing. On the other hand, when it is determined that the online meeting has ended (Step S28: YES), the analysis apparatus 200 ends the series of processing.

The processing of the analysis apparatus 200 according to the second example embodiment has been described above. According to the aforementioned flowchart, the analysis apparatus 200 is able to output the analysis data for a chapter (or a chapter group) generated every time a new chapter is generated in the meeting that is being held. Accordingly, the user who uses the analysis system 10 is able to efficiently conduct a meeting using the analysis data that is provided every time, for example, a new chapter is generated, in the meeting that is being held. For example, the user is able to change the level of communication in order to achieve smooth communication in the meeting that is being held using the analysis data that is provided every time a new chapter is generated.

Figure 8:
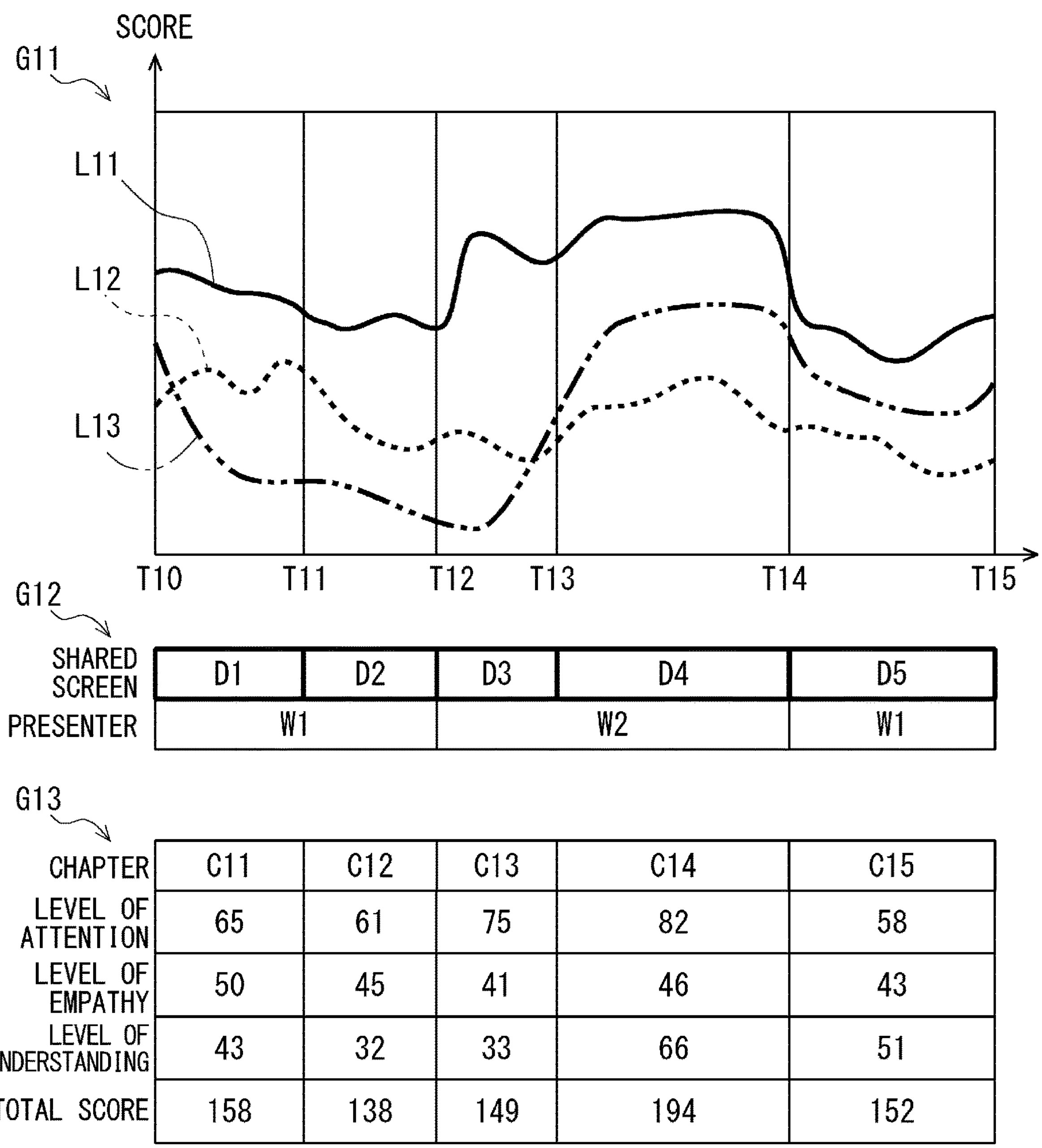
FIG. 8 is a diagram showing a first example of analysis data.

Referring next to FIG. 8, an example of the analysis data will be described. FIG. 8 is a diagram showing a first example of the analysis data. FIG. 8 shows, in the upper stage, a graph G11 that shows each of the analysis source data items (emotion data or intermediate data analyzed from this emotion data) from which the analysis data shown by one analysis value is generated in a time series. FIG. 8 shows, in the middle stage, meeting data G12 that corresponds to the above time series. FIG. 8 shows, in the lower stage, analysis data G13 for each chapter that corresponds to the above meeting data (analysis data indicated by one analysis value and the analysis source data from which the analysis data is generated). As described above, the analysis source data from which the analysis data is generated may correspond to intermediate data which is in the middle of analysis depending on the kinds of the emotion data to be input or a method for calculating one analysis value.

In the graph G11, the horizontal axis indicates time and the vertical axis indicates the score of the analysis source data. The left end of the horizontal axis is time T10, the time elapses as it moves to the right, and the right end is time T15. The time T10 corresponds to the start time of the meeting and time T15 corresponds to the end time of the meeting. The times T11, T12, T13, and T14 between time T10 and time T15 indicate the times that correspond to chapters that will be described later.

Further, in the graph G11, first analysis source data L11 shown by a solid line, second analysis source data L12 shown by a dotted line, and third analysis source data L13 shown by an alternate long and two short dashes line are plotted. The first analysis source data L11 indicates the level of attention used to generate the analysis data (data of one analysis value: in this example, total score). The second analysis source data L12 indicates the level of empathy used to generate the total score. The third analysis source data L13 indicates the level of understanding used to generate the total score.

The meeting data G12 shows data regarding the shared screen of the meeting and data regarding a speaker (presenter) in a time series. That is, data regarding the display screen indicates that the shared screen from time T10 to time T11 has been a screen D1. Further, the data regarding the display screen indicates that the shared screen from time T11 to time T12 has been a screen D2. Likewise, the meeting data G12 indicates that the shared screen in the meeting has been a screen D3 from time T12 to time T13, a screen D4 from time T13 to time T14, and a screen D5 from time T14 to time T15. It is assumed that the display screen is basically the same as a display image displayed on a part or the whole of the screen of the display unit.

Further, in the meeting data G12, the data regarding the presenter indicates that the presenter has been a presenter W1 from time T10 to time T12. Likewise, the data regarding the presenter indicates that the presenter has been a presenter W2 from time T12 to time T14 and that the presenter has been the presenter W1 again from time T14 to time T15.

The relation between the shared screen and the presenter in the aforementioned meeting data G12 will be described in a time series. The presenter W1 proceeds with the meeting from time T10 when the meeting has been started to time T12 and the presenter W1 has displayed the screen D1 as a shared screen (i.e., share the screen D1) as the shared screen from time T10 to time T11. Next, the presenter W1 has continued the presentation after switching the shared screen from the screen D1 to the screen D2 from time T11 to time T12. Next, at time T12, the presenter has been switched from the presenter W1 to the presenter W2. The presenter W2 has shared the screen D3 between time T12 and time T13 and shared the screen D4 between time T13 and time T14. In the period between time T14 and time T15, the presenter W1 switched from the presenter W2 has shared the screen D5.

The relation between the shared screen and the presenter in the meeting data G12 has been described above in a time series. As described above, the meeting data shown in FIG. 8 includes data regarding the period during which the screen data is displayed on the shared screen and data indicating who the presenter is. The chapter generation unit 115 is able to generate chapters in accordance with data regarding the shared screen of the aforementioned meeting data.

The analysis data G13 shows data indicating chapters that correspond to the aforementioned meeting data, and the analysis source data and the analysis data to be output, both of which corresponding to the chapters, in a time series. In the example shown in FIG. 8, data indicating chapters corresponds to data regarding the shared screen of the meeting data. That is, the first chapter C11 is a period from time T10 to T11 during which the screen D1 has been shared. Likewise, the second chapter C12 is a period from time T11 to time T12 during which the screen D2 has been shared. The third chapter C13 is a period from time T12 to time T13 during which the screen D3 has been shared. The fourth chapter C14 is a period from time T13 to time T14 during which the screen D4 has been shared. The fifth chapter C15 is a period from time T14 to time T15 during which the screen D5 has been shared.

As shown in FIG. 8, the analysis data G13 shows the analysis source data (the level of attention, the level of empathy, and the level of understanding) and analysis data (the total score obtained by summing up the above data items) corresponding to each chapter. The analysis data G13 shows, for example, as the analysis source data that corresponds to the chapter C11, that the level of attention is 65, the level of empathy is 50, and the level of understanding is 43. Further, the analysis data G13 shows 158 as the total score. Likewise, the analysis data G13 shows, for example, as the analysis data that corresponds to the chapter C12, that the level of attention is 61, the level of empathy is 45, the level of understanding is 32, and the total score is 138.

The aforementioned analysis source data corresponds to data plotted in the graph G11. That is, the analysis source data and the analysis data shown as the analysis data G13 are respectively the average value of the analysis source data and the average value of the analysis data calculated in the period of the corresponding chapter.

The examples of the analysis data have been described above. In the example shown in FIG. 8, the chapter generation unit 115 sets the timing when the shared screen is switched of the meeting data as the timing when the chapter is switched. Then the analysis data generation unit 112 calculates the analysis data in the period from the start of the meeting to the end of the meeting for each of the aforementioned chapters. Accordingly, the analysis system 10 is able to provide analysis data for each shared screen that is displayed.

In the example shown in FIG. 8, as shown in the aforementioned graph G11, the analysis system 10 may be configured so as to calculate the analysis source data for each first period and plot them. Accordingly, the analysis system is able to show detailed changes of the analysis source data in the meeting. However, in this example embodiment, the initial state is a state in which the analysis data is shown. Therefore, the aforementioned details may be displayed when the user wants to visually recognize further detailed information from the above state.

Figure 9:
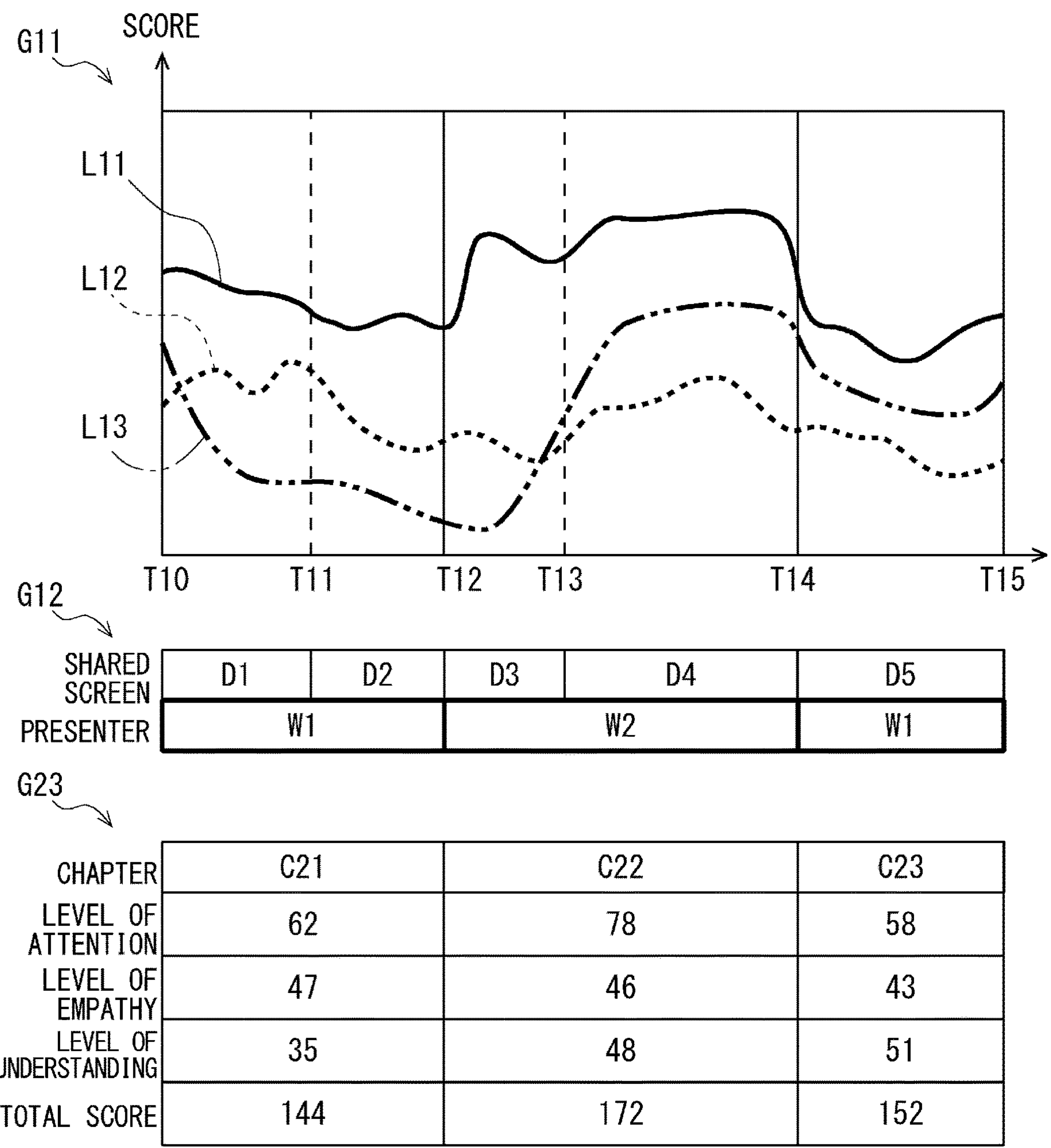
FIG. 9 is a diagram showing a second example of the analysis data.

Referring next to FIG. 9, another example of the analysis data will be further described. FIG. 9 is a diagram showing a second example of the analysis data. In FIG. 9, the first analysis source data L11, the second analysis source data L12, and the third analysis source data L13 shown in the graph G11 in the upper stage are the same as those shown in FIG. 8. Further, the meeting data G12 in the middle stage is the same as that shown in FIG. 8.

In FIG. 9, analysis data G23 shown in the lower stage is different from the analysis source data and the analysis data shown in FIG. 8 in that the data for generating the chapters is data regarding presenters in the analysis data G23 shown in the lower stage. That is, in the example shown in FIG. 9, the chapter generation unit 115 sets a period from time T10 to time T12 during which the presenter W1 has been a presenter, as a first chapter C21. Likewise, the chapter generation unit 115 sets a period from time T12 to time T14 during which the presenter W2 has been a presenter, as a second chapter C22. Further, the chapter generation unit 115 sets a period from time T14 to time T15 during which the presenter W1 has been a presenter as a third chapter C23.

In FIG. 9, the analysis source data and the analysis data are shown to correspond to the aforementioned chapters C21-C23. That is, the analysis source data that corresponds to the chapter C21 shows that the level of attention is 62, the level of empathy is 47, and the level of understanding is 35, and the analysis data that corresponds to the chapter C21 shows that the total score is 144. The analysis source data that corresponds to the chapter C22 shows that the level of attention is 78, the level of empathy is 46, and the level of understanding is 48, and the analysis data that corresponds to the chapter C22 shows that the total score is 172. The analysis source data that corresponds to the chapter C23 shows that the level of attention is 58, the level of empathy is 43, and the level of understanding is 51, and the analysis data that corresponds to the chapter C23 shows that the total score is 152.

The second example of the analysis data has been described above. In the example shown in FIG. 9, the chapter generation unit 115 sets the timing when the presenter is switched of the meeting data as the timing when the chapter is switched. Then, the analysis data generation unit 112 generates the analysis data from the start of the meeting to the end of the meeting for each of the aforementioned chapters. Accordingly, the analysis system 10 is able to provide analysis data for each presenter.

Figure 10:
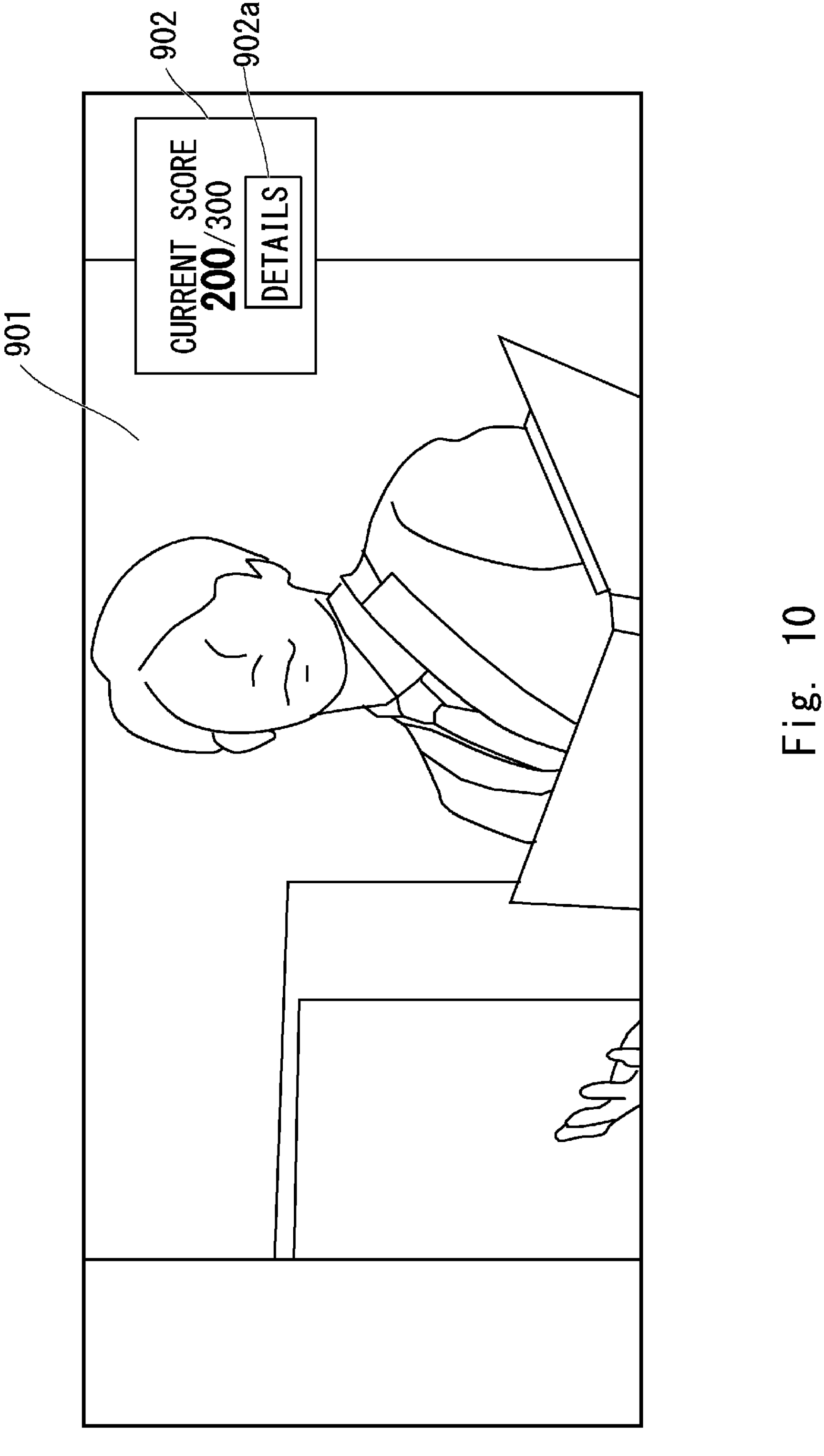
FIG. 10 is a diagram showing a display example of the analysis data.
Figure 11:
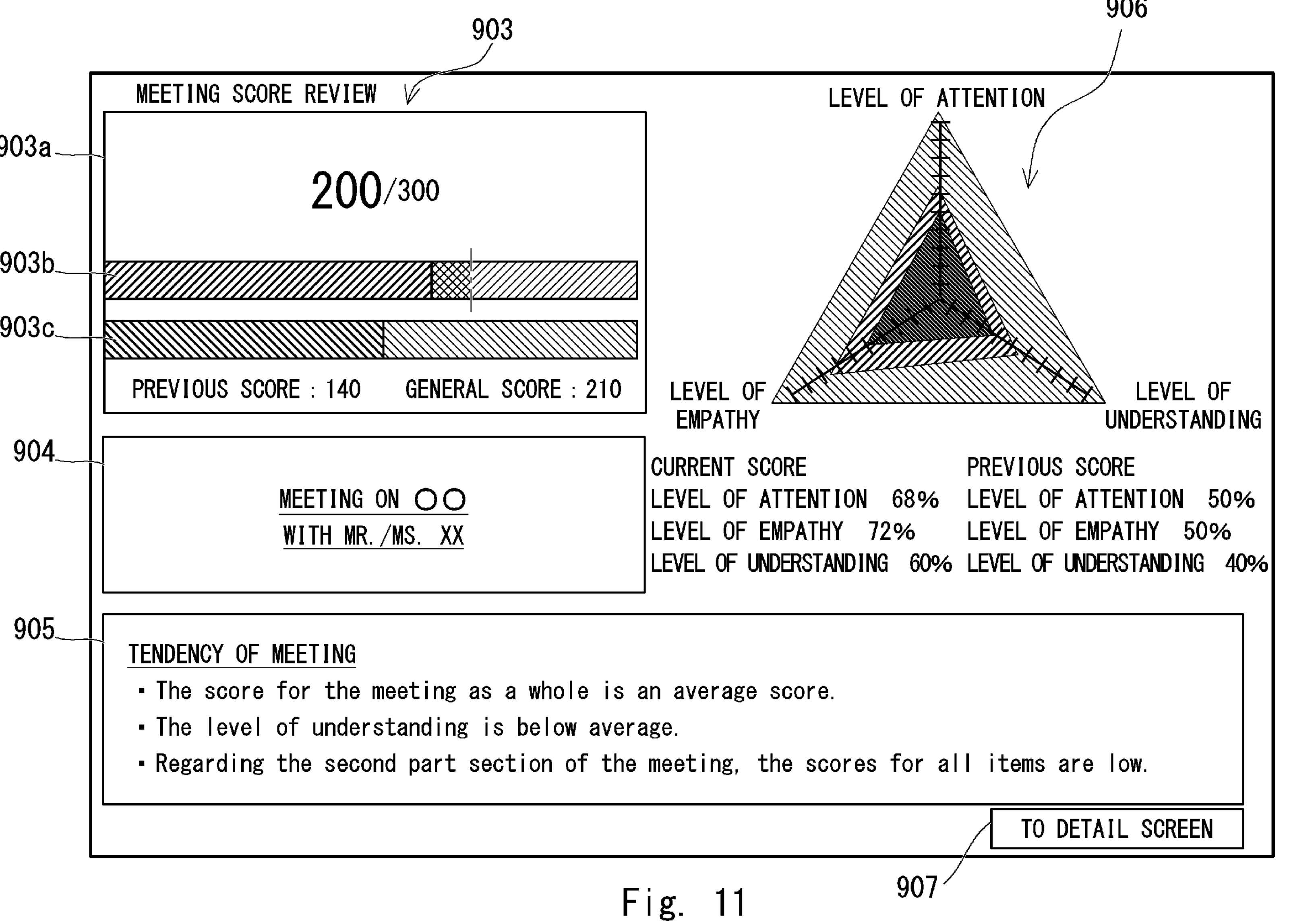
FIG. 11 is a diagram showing a display example of a screen transited from a display screen shown in FIG. 10.
Figure 12:
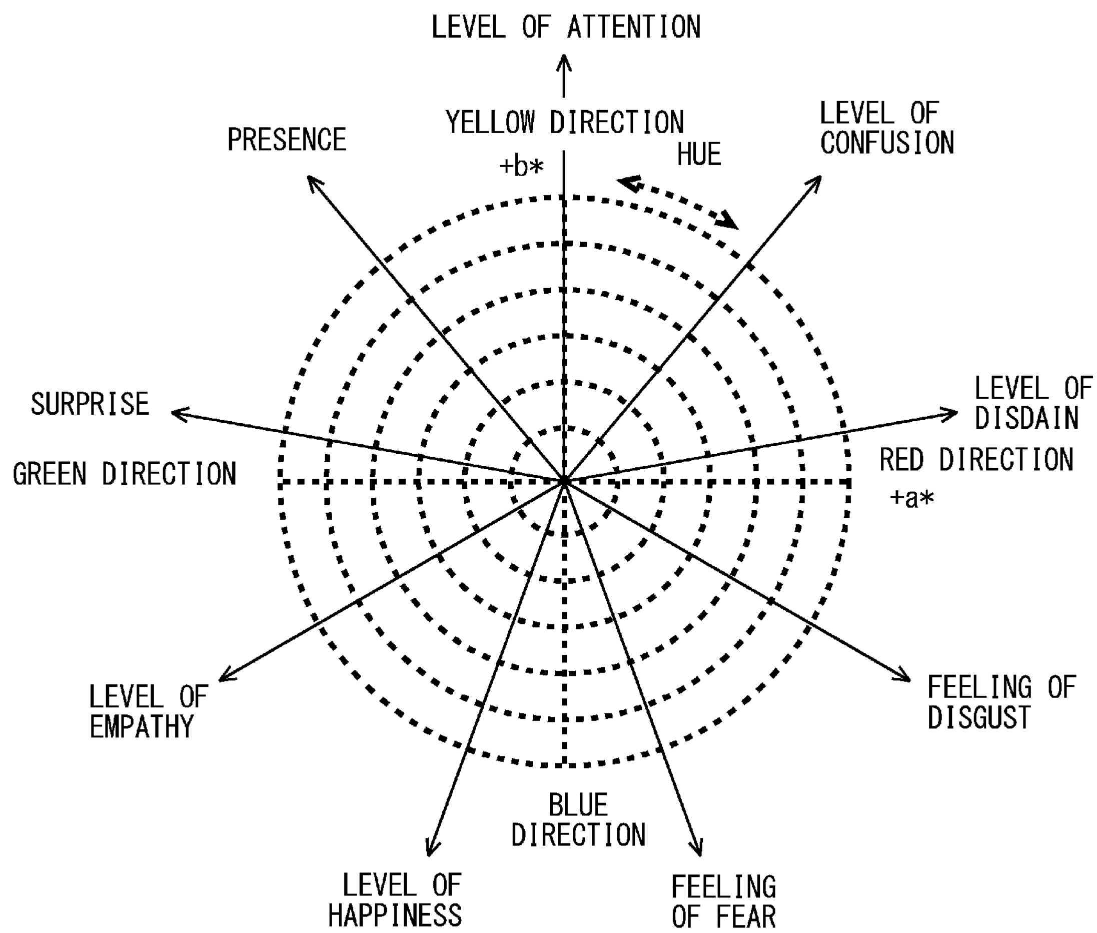
FIG. 12 is a diagram showing an example of a color space that corresponds to analysis source data.

Next, display examples of the analysis data shown by one analysis value, which is one of the main features of this example embodiment, will be described with reference to FIGS. 10 to 12. FIG. 10 is a diagram showing a display example of the analysis data and FIG. 11 is a diagram showing a display example of a screen transited from the display screen shown in FIG. 10. Further, FIG. 12 is a diagram showing an example of a color space that corresponds to the analysis source data (numerical values of the respective indices of the emotion data).

The output unit 113 shown in FIG. 4 is able to output the analysis data to the meeting terminal 900A and the like in real time in such a way that an analysis data display image 902 is superimposed on a meeting image 901 shown in FIG. 10. The analysis data display image 902 includes the one current analysis value as "the current score", which shows an example in which the score is 200 points out of 300 points. The display example of the analysis data display image 902 shown in FIG. 10 may be output as a relative value output example when the past analysis value calculated from the analysis history data is "300" and the analysis value at the current time is "200".

Further, while an example in which the analysis data display image 902 includes a detail button 902*a* is shown in the example in FIG. 10, the detail button 902*a* may not be displayed. The detail button 902*a* may be a button for causing the screen to transit to a review screen illustrated in the screen as shown in FIG. 11 when the detail button 902*a* is touched by the user. The review screen shown in FIG. 11 includes a review image 903 including, besides "200/300", an indicator 903*b* indicating the score at the current time (200 points out of 300 points) and an indicator 903*c* indicating the previous score. The indicator 903*b* shows the target score by a vertical line and shows an unachieved part of the score shown by the vertical line by a different color. Further, the review image shown in FIG. 11 includes an image 906 indicating scores of the analysis source data based on which the score is calculated (or it may be the emotion data itself). The image 906 may include numerical values and graphs indicating percentages. This example shows that the score this time "200" is calculated from the level of attention 68%, the level of empathy 72%, and the level of understanding 60% and that the previous score "140" is calculated from the level of attention 50%, the level of empathy 50%, and the level of understanding 40%.

Further, the review screen shown in FIG. 11 may include an image 904 indicating the meeting information, an image 905 indicating information on the tendency in the meeting, and a detail screen button 907 for causing the screen to transit to a more detailed screen. The image 904 shows, if there is a facilitator, the name of the facilitator as the meeting information and the image 905 shows information indicating the tendency of the overall meeting as a meeting report. The information indicating tendency is information indicating features of this meeting. For example, this information may include information indicating the score this time, information indicating one of the items of the emotion data such as the level of understanding that has exhibited a particularly characteristic value, and information indicating a particularly noticeable point in a chapter (in this example, it is referred to as a "part section"). In this example, as an example in which the second period is a chapter group including a plurality of chapters, information on the part section is included as well. The detail screen button 907 causes the screen to transit to the screen as shown in, for example, FIG. 8 or 9 when the detail screen button 907 is touched by the user.

Further, the score this time illustrated as "200" in FIG. 10 or 11 may be displayed by a color tone indicated by a significant or dominant item of the kinds (items) of the emotions based on which the score this time has been calculated. This color tone may be determined, for example, by referring to the color tone expressed by the color space illustrated in FIG. 12.

In the color space shown in FIG. 12, nine emotion data items that the emotion data generation apparatus 300 outputs are distributed radially in a La*b*color space. The La*b*color space is a color space in which the circumference direction indicates hue and the radial direction indicates color saturation. When, for example, the value indicating the level of attention is larger than those of the other items, the score this time is shown by yellow. Further, the indicators 903*b* and 903*c* may be expressed using color tones as described above.

While the analysis source data is shown by the La*b*color space in FIG. 12, it may be shown by another color space. For example, the analysis system 10 may show the analysis source data by "Plutchik's wheel of emotions". In this case, the analysis system 10 plots significant or dominant analysis source data in Plutchik's wheel of emotions and displays the analysis data by the color tones in the positions of the plots. Accordingly, the user who uses the analysis data including color tones is able to intuitively know the tendency of the emotions in the meeting from the analysis data.

The above description has been made based on the assumption that the ongoing online meeting includes consecutive online meetings. Note that, as described above, since the meeting data includes the time of breaks, the ongoing online meeting may include a plurality of online meetings held at intervals, which can be processed as the ongoing online meeting. This is because, when, for example, the break in the meeting is long (e.g., one day or longer), the aforementioned ongoing online meeting may be defined as a plurality of online meetings. The aforementioned plurality of online meetings may be, for example, those having a common theme or those where a certain percentage or more of participants who participate in one online meeting participate in another online meeting as well. The plurality of online meetings may be distinguished from one another by attribute data. However, this is merely one example.

While the second example embodiment has been described above, the configuration of the analysis system 10 according to the second example embodiment is not limited to the aforementioned one. For example, the analysis system 10 may include a meeting management apparatus 400. In this case, the analysis apparatus 200, the emotion data generation apparatus 300, and the meeting management apparatus 400 may be provided separately from one another or some or all of them may be integrated. Further, for example, the function that the emotion data generation apparatus 300 includes may be formed as a program and included in the analysis apparatus 200 or the meeting management apparatus 400. For example, the identification of the person, the generation of the individual emotion data and the like may be executed by the analysis apparatus 200. Further, the meeting management apparatus 400 may be configured to generate the chapters and the analysis apparatus 200 may be configured to receive and use this information.

Other Example Embodiments

While the function of each part of the analysis apparatus, the function of each part of the emotion data generation apparatus, the function of the meeting management apparatus, the function of the meeting terminal (meeting terminal apparatus), and the function of the user terminal (user terminal apparatus) have been described above in each of the aforementioned example embodiments, these functions may be achieved as each apparatus. Further, the division of functions may be changed among these apparatuses. Further, various examples described in each of the example embodiments may be combined as appropriate.

Figure 13:
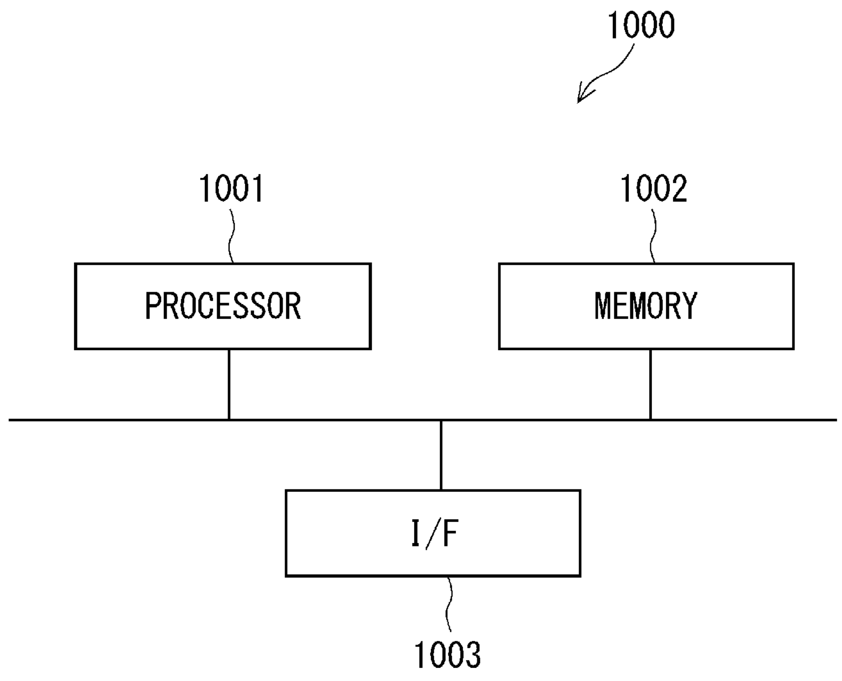
FIG. 13 is a diagram showing one example of a partial hardware configuration of apparatuses.

Further, each of the apparatuses according to each of the example embodiments may include, for example, a hardware configuration as follows. FIG. 13 is a diagram showing one example of a partial hardware configuration of each of the apparatuses according to each of the example embodiments.

An apparatus 1000 shown in FIG. 13 includes a processor 1001, a memory 1002, and an interface (I/F) 1003. The I/F 1003 is a communication I/F for communicating with another apparatus. When the apparatus 1000 is an apparatus that the user uses, the I/F 1003 may include an I/F with a display apparatus, an operation unit that receives a user operation, or an I/F with the operation unit. The function of each apparatus described in each of the example embodiments is achieved by the processor 1001 loading the program stored in the memory 1002 and executing the loaded program while collaborating with the I/F 1003.

In the aforementioned examples, the aforementioned program can be stored and provided to a computer using any type of non-transitory computer readable media. Non-transitory computer readable medium include any type of tangible storage media. Examples of non-transitory computer readable media include magnetic storage media (e.g., flexible disks, magnetic tapes, hard disk drives) and optical magnetic storage media (e.g., magneto-optical disks). The examples thereof further include CD-Read Only Memory (ROM), CD-R, and CD-R/W. The examples thereof further include semiconductor memories (e.g., a mask ROM, a Programmable ROM (PROM), an Erasable PROM (EPROM), a flash ROM, and Random Access Memory (RAM)). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the aforementioned example embodiments and may be changed as appropriate without departing from the spirit of the present invention. Further, the present disclosure may be executed by combining the example embodiments as appropriate.

The whole or part of the example embodiments disclosed above can be described as, but not limited to, the following supplementary notes.

(Supplementary Note 1)

An analysis apparatus comprising:

emotion data acquisition means for sequentially acquiring emotion data generated for each first period based on face image data of participants during an online meeting;

analysis data generation means for generating analysis data indicating one analysis value regarding an evaluation for a second period in an ongoing online meeting based on the emotion data including at least the latest data; and output means for sequentially outputting the analysis data generated by the analysis data generation means.

(Supplementary Note 2)

The analysis apparatus according to Supplementary Note 1, wherein the second period is a period from a timing when the ongoing online meeting was started to a last time the emotion data was acquired.

(Supplementary Note 3)

The analysis apparatus according to Supplementary Note 1, wherein the second period is a certain period of time to a last time the emotion data in the ongoing online meeting was acquired.

(Supplementary Note 4)

The analysis apparatus according to Supplementary Note 2 or 3, comprising:

storage means for storing the analysis data generated by the analysis data generation means as analysis history data, wherein the analysis data generation means calculates the one analysis value regarding the second period for which the analysis data is to be generated as a relative value for a statistical value of a past analysis value indicated by the one analysis history data item or past analysis values indicated by a plurality of the analysis history data items regarding the ongoing online meeting.

(Supplementary Note 5)

The analysis apparatus according to Supplementary Note 2 or 3, comprising:

storage means for storing the analysis data generated by the analysis data generation means as analysis history data, wherein the analysis data generation means calculates the one analysis value regarding the second period for which the analysis data is to be generated as a relative value for a statistical value of a past analysis value indicated by the one analysis history data item regarding a previously-held online meeting that has been held before the ongoing online meeting, or past analysis values indicated by a plurality of the analysis history data items regarding one or more previously-held online meetings.

(Supplementary Note 6)

The analysis apparatus according to any one of Supplementary Notes 1 to 5, wherein the emotion data includes individual emotion data for each of the participants, and the analysis data generation means generates the analysis data for each of the participants based on the individual emotion data including at least the latest data.

(Supplementary Note 7)

The analysis apparatus according to any one of Supplementary Notes 1 to 5, wherein the emotion data includes individual emotion data for each of the participants and data of segmentation to which the participant belongs, and the analysis data generation means generates the analysis data for each of the participants based on the individual emotion data including at least the latest data and the segmentation data.

(Supplementary Note 8)

The analysis apparatus according to any one of Supplementary Notes 1 to 5, wherein the emotion data includes individual emotion data for each of the participants, and the analysis data generation means adds a weight to the individual emotion data regarding a presenter included in the participants different from a weight added to the individual emotion data regarding the other participants and then generates the analysis data.

(Supplementary Note 9)

The analysis apparatus according to any one of Supplementary Notes 1 to 8, wherein the emotion data includes attribute data indicating attributes of the target online meeting, and the analysis data generation means generates the analysis data in accordance with the attribute data regarding the ongoing online meeting.

(Supplementary Note 10)

The analysis apparatus according to any one of Supplementary Notes 1 to 9, comprising:

meeting data acquisition means for sequentially acquiring meeting data regarding the online meeting that includes time data; and chapter generation means for generating chapters for the online meeting based on the meeting data, wherein the second period is a period from a start time to an end time regarding a chapter group formed of one chapter or a plurality of consecutive chapters generated by the chapter generation means.

(Supplementary Note 11)

The analysis apparatus according to Supplementary Note 10, wherein the meeting data includes data regarding screen sharing in the online meeting, and the chapter generation means generates the chapters based on the data regarding the screen sharing.

(Supplementary Note 12)

The analysis apparatus according to Supplementary Note 11, wherein the chapter generation means generates the chapter in accordance with a timing when the screen sharing is switched.

(Supplementary Note 13)

The analysis apparatus according to Supplementary Note 11 or 12, wherein the chapter generation means generates the chapter in accordance with a time when the owner of the shared screen in the screen sharing is switched.

(Supplementary Note 14)

The analysis apparatus according to any one of Supplementary Notes 1 to 13, wherein the emotion data is data in which states of a plurality of kinds of emotions are indicated by numerical values.

(Supplementary Note 15)

The analysis apparatus according to Supplementary Note 14, wherein the analysis data generation means generates the analysis data in such a way that a color tone added to the one analysis value is determined based on a predetermined condition regarding significance or predominance among numerical values indicating the states of the plurality of kinds of emotions, each of the states of the plurality of kinds of emotions being expressed by a color tone based on a preset index, and that the one analysis value is expressed by adding the determined color tone.

(Supplementary Note 16)

The analysis apparatus according to any one of Supplementary Notes 1 to 15, wherein the ongoing online meeting is formed of a plurality of online meetings held at intervals.

(Supplementary Note 17)

The analysis apparatus according to any one of Supplementary Notes 1 to 16, wherein the output means sequentially outputs the analysis data to a system for providing the ongoing online meeting in such a way that the analysis data may be superimposed on the screen of the ongoing online meeting.

(Supplementary Note 18)

An analysis system comprising:

the analysis apparatus according to any one of Supplementary Notes 1 to 17; and an emotion data generation apparatus configured to generate the emotion data and provide the emotion data for the analysis apparatus.

(Supplementary Note 19)

An analysis method, wherein a computer performs the following processing of:

sequentially acquiring emotion data generated for each first period based on face image data of participants during an online meeting;

generating analysis data indicating one analysis value regarding an evaluation for a second period in an ongoing online meeting based on the emotion data including at least the latest data; and sequentially outputting the generated analysis data.

(Supplementary Note 20)

A non-transitory computer readable medium storing an analysis program for causing a computer to execute the processing of:

sequentially acquiring emotion data generated for each first period based on face image data of participants during an online meeting;

generating analysis data indicating one analysis value regarding an evaluation for a second period in an ongoing online meeting based on the emotion data including at least the latest data; and processing for sequentially outputting the generated analysis data.

REFERENCE SIGNS LIST

10 ANALYSIS SYSTEM
90 MEETING TERMINAL GROUP
100 ANALYSIS APPARATUS
111 EMOTION DATA ACQUISITION UNIT
112 ANALYSIS DATA GENERATION UNIT
113 OUTPUT UNIT
114 MEETING DATA ACQUISITION UNIT
115 CHAPTER GENERATION UNIT
120 STORAGE UNIT
200 ANALYSIS APPARATUS
300 EMOTION DATA GENERATION APPARATUS
311 PARTICIPANT DATA ACQUISITION UNIT
312 EMOTION DATA GENERATION UNIT
313 EMOTION DATA OUTPUT UNIT
400 MEETING MANAGEMENT APPARATUS
900A, 900B, 900N MEETING TERMINAL
901 MEETING IMAGE
902 ANALYSIS DATA DISPLAY IMAGE
990 USER TERMINAL
N NETWORK

What is claimed is:

1. An analysis apparatus comprising at least one memory storing instructions; and at least one processor configured to execute the instructions to:

sequentially acquire emotion data generated for each first period based on face image data of participants during an online meeting;

sequentially acquire meeting data regarding the online meeting that includes time data;

generate chapters for the online meeting based on the meeting data;

generate analysis data indicating one analysis value regarding an evaluation for a second period in an ongoing online meeting based on the emotion data including at least the latest data; and sequentially output the generated analysis data, wherein:

the second period is a period from a start time to an end time regarding a chapter group formed of one generated chapter or a plurality of generated consecutive chapters, the meeting data includes data regarding screen sharing in the online meeting, and the at least one processor is further configured to execute the instructions to generate the chapters based on the data regarding the screen sharing in accordance with at least one of a timing when the screen sharing is switched or a time when the owner of the shared screen in the screen sharing is switched.

2. The analysis apparatus according to claim 1, wherein:

the emotion data includes individual emotion data for each of the participants, and the at least one processor is further configured to execute the instructions to generate the analysis data for each of the participants based on the individual emotion data including at least the latest data.

3. The analysis apparatus according to claim 1, wherein:

the emotion data includes individual emotion data for each of the participants and data of segmentation to which the participant belongs, and the at least one processor is further configured to execute the instructions to generate the analysis data for each of the participants based on the individual emotion data including at least the latest data and the segmentation data.

4. The analysis apparatus according to claim 1, wherein:

the emotion data includes individual emotion data for each of the participants, and the at least one processor is further configured to execute the instructions to add a weight to the individual emotion data regarding a presenter included in the participants different from a weight added to the individual emotion data regarding the other participants and then generate the analysis data.

5. The analysis apparatus according to claim 1, wherein:

the emotion data includes attribute data indicating attributes of the target online meeting, and the at least one processor is further configured to execute the instructions to generate the analysis data in accordance with the attribute data regarding the ongoing online meeting.

6. The analysis apparatus according to claim 1, wherein the emotion data is data in which are indicated by numerical values.

7. The analysis apparatus according to claim 6, wherein the at least one processor is further configured to execute the instructions to generate the analysis data in such a way that a color tone added to the one analysis value is determined based on a predetermined condition regarding significance or predominance among numerical values indicating the states of the plurality of kinds of emotions, each of the states of the plurality of kinds of emotions being expressed by a color tone based on a preset index, and that the one analysis value is expressed by adding the determined color tone.

8. The analysis apparatus according to claim 1, wherein the ongoing online meeting is formed of a plurality of online meetings held at intervals.

9. The analysis apparatus according to claim 1, wherein the at least one processor is further configured to execute the instructions to sequentially output the analysis data to a system for providing the ongoing online meeting in such a way that the analysis data may be superimposed on the screen of the ongoing online meeting.

10. An analysis system comprising:

the analysis apparatus according to claim 1; and an emotion data generation apparatus configured to generate the emotion data and provide the emotion data for the analysis apparatus.

11. An analysis method, comprising:

a computer performing processing comprising:

sequentially acquiring emotion data generated for each first period based on face image data of participants during an online meeting;

sequentially acquiring meeting data regarding the online meeting that includes time data;

generating chapters for the online meeting based on the meeting data;

generating analysis data indicating one analysis value regarding an evaluation for a second period in an ongoing online meeting based on the emotion data including at least the latest data; and sequentially outputting the generated analysis data, wherein:

the second period is a period from a start time to an end time regarding a chapter group formed of one generated chapter or a plurality of generated consecutive chapters, the meeting data includes data regarding screen sharing in the online meeting, and the generating chapters is generating the chapters based on the data regarding the screen sharing in accordance with at least one of a timing when the screen sharing is switched or a time when the owner of the shared screen in the screen sharing is switched.

12. A non-transitory computer readable medium storing an analysis program for causing a computer to execute processing comprising:

sequentially acquiring emotion data generated for each first period based on face image data of participants during an online meeting;

sequentially acquiring meeting data regarding the online meeting that includes time data;

generating chapters for the online meeting based on the meeting data;

generating analysis data indicating one analysis value regarding an evaluation for a second period in an ongoing online meeting based on the emotion data including at least the latest data; and processing comprising sequentially outputting the generated analysis data, wherein:

the second period is a period from a start time to an end time regarding a chapter group formed of one generated chapter or a plurality of generated consecutive chapters, the meeting data includes data regarding screen sharing in the online meeting, and the generating chapters is generating the chapters based on the data regarding the screen sharing in accordance with at least one of a timing when the screen sharing is switched or a time when the owner of the shared screen in the screen sharing is switched.

* * * * *